United States Patent [19]

Horsch

[11] Patent Number: 4,698,898

[45] Date of Patent: Oct. 13, 1987

[54] MACHINE TOOL WITH TOOL CHANGING DEVICE

[76] Inventor: Wilfried Horsch, Pfaffenklinge 10, D-6951 Obrigheim, Fed. Rep. of Germany

[21] Appl. No.: 682,209

[22] Filed: Dec. 17, 1984

[30] Foreign Application Priority Data

Dec. 22, 1983 [DE] Fed. Rep. of Germany ....... 3346467

[51] Int. Cl.⁴ .............................................. B23Q 3/157
[52] U.S. Cl. ..................................... 29/568; 82/36 R
[58] Field of Search ................. 29/568, 264; 409/232, 409/233, 234; 82/36 R, 36 A, 37 R

[56] References Cited

U.S. PATENT DOCUMENTS

| 3,587,164 | 6/1971 | Davern | 29/568 |
| 3,762,271 | 10/1973 | Poincenot | 409/233 |
| 3,765,291 | 10/1973 | Stenfeldt | 29/568 X |
| 4,119,213 | 10/1978 | Sato et al. | 29/568 X |
| 4,141,133 | 2/1979 | Grinage | 29/568 |
| 4,206,665 | 6/1980 | Schurfeld et al. | 82/36 R |
| 4,510,829 | 4/1985 | Kintzel et al. | 82/36 R |

FOREIGN PATENT DOCUMENTS

| 479674 | 8/1968 | Japan | 29/568 |
| 379336 | 7/1973 | U.S.S.R. | 409/233 |

Primary Examiner—Gil Weidenfeld
Assistant Examiner—Glenn L. Webb

[57] ABSTRACT

A numerically controlled machine tool includes a rotating tool in the form of a changeable tool block and an associated tool changing device. The tool-changing device includes a double-sided changing arm pivotable about an axis parallel to the spindle axis and includes a tool gripper for the transfer of tools between the spindle head and a tool magazine at each end. The tool block is clampable by the clamping device in radially differing positions on the spindle head. For this purpose, the tool block and the spindle head are provided with pointed teeth serving as clamping surfaces. The changing arm is longitudinally displaceable for the radial setting of the tool block. The clamping device further includes a spring device supported at the spindle head for applying the clamping force and an actuating device mounted on a separate carriage for applying the releasing force. The clamping device is so designed that, during the release procedure, it simultaneously lifts the tool block from the spindle head, and the actuating device of the clamping device is so connected to the changing arm that it moves the changing arm synchronously with the tool block during the raising of the tool block.

17 Claims, 8 Drawing Figures

MACHINE TOOL WITH TOOL CHANGING DEVICE

BACKGROUND OF THE INVENTION

This invention relates to a machine tool having a tool-changing device, which has a working spindle with a spindle head to accept a rotating tool in the form of an exchangeable tool block and a releasable clamping device for clamping the tool block to the spindle head, the tool changing device being provided with a double-sided changing arm, which, for tool transfer between the spindle head and a tool magazine, is provided with a tool gripper at each of its two ends and is pivotable about a pivoting axis parallel to the spindle axis.

DISCUSSION OF THE PRIOR ART

Machine tools with tool changing devices of this type are known, for example, from German Pat. No. (PS) 1,477,501 and German Pats. Nos. (OS) 2,616,459, 2,808,796, 2,818,092 and 3,116,023. These machine tools can, for example, be used for boring, milling, thread cutting or the like. The tools are usually attached to conical shaft tool holders which are clamped in a correspondingly designed chuck on the spindle head. Location of the tools in radially different positions relative to the spindle axis is not possible by this means. Since the clamping and release of the tool, on the one hand, and the actuation of the tool changing device, on the other, occur separately from one another, tool changing requires a comparatively large amount of time.

SUMMARY OF THE INVENTION

The object of the present invention is to create a numerically controlled machine tool having a rotating tool and a tool changing device with which features the tool can be clamped in radially different positions on the spindle head, the tool changing device being capable of moving the tool in a simple manner into appropriate radially different positions. The tool change should, however, require as little time as possible. The control technology and design requirements should not be too large but a high setting accuracy should be guaranteed. In addition, the machine tool should be as flexibly usable as possible and be applicable for many types of tools.

In accordance with one aspect of the invention, the tool block is clampable, by means of the clamping device, in radially different positions on the spindle head and the changing arm, for the radial setting of the tool block, is longitudinally displaceable in an adjustment direction running at right angles to the spindle axis. The tool block and the spindle head are preferably provided with pointed teeth serving as clamping surfaces, which teeth lie in radial planes and whose grooves run at right angles to the adjustment direction. An adjustable stop, which limits a longitudinal displacement of the changing arm corresponding to a desired radial position of the tool block, is preferably provided.

In accordance with a further aspect of the invention, the clamping device, which has a spring device supported on the spindle head to provide the clamping force and an actuation device for providing the release force, is so designed that it lifts the tool block from the spindle head simultaneously during the release procedure. The actuating device of the clamping device is preferably so connected to the changing arm that it moves the changing arm synchronously with the tool block during the raising of the tool block.

In a further embodiment of the invention, the actuating device is provided on a support body located outside the working spindle and is connectable by means of a releasable clutch with the part of the clamping device located in the spindle head.

The tool blocks form part of tool changing sets for various types of machining such, for example, as final boring, preliminary boring, fine turning, copyturning, face turning, undercutting, recessing, screwcutting (with thread tap or cutter) and thread chasing. Because of the possibility of clamping the tool in radially different locations on the spindle head, the machine tool can, for example, be used for fine boring at different bore diameters.

The spindle head preferably has a radially adjustable facing slide, serving as tool carrier, in which facing slide the clamping device and the spring device are located and supported. This opens corresponding machining responsibilities, the actuating device of the clamping device being preferably provided on a support body located outside the working spindle and being connectable, by means of a releasable clutch, with the part of the clamping device located in the facing slide. The central part of the spindle head outside the facing slide is, therefore, free for one or more tension rods for displacing the facing slide and, for example, for limiting the facing slide movement by means of adjustable end stops.

BRIEF DESCRIPTION OF THE DRAWINGS

Further advantageous embodiments of the invention emerge from the claims.

One embodiment example of the invention is described using the drawings. In these.

DETAILED DESCRIPTION

Figure 1:
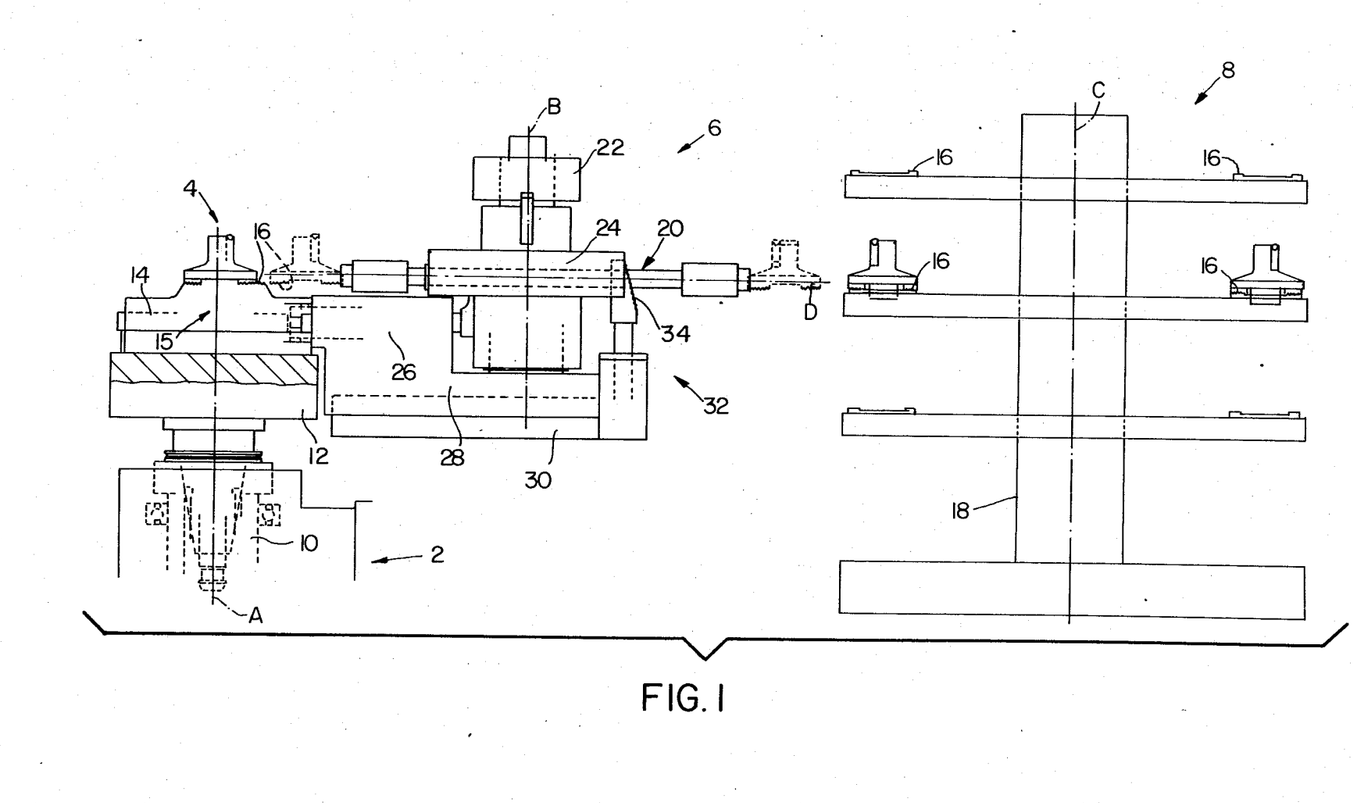
FIG. 1 shows a schematic overall representation of the spindle head of a numerically controlled machine tool having an automatically operating tool changing device.

In FIG. 1, a numerically controlled machine tool 2 with a rotating tool 4, a toolchanging device 6 and a tool magazine 8 are indicated. The numerically controlled machine tool 2 can be used, for example, for boring, (final boring, preliminary boring), turning (fine turning, copyturning, face turning, undercutting, recessing), screw cutting (with thread tap or cutter), thread chasing and similar types of machining.

The exchangeable tools have the form of tool blocks 4 with identical clamping geometry. By this means, tool changing sets can be controlled which, for example, consist of rough turning, final turning and fine turning tools. As indicated, the tool blocks 4 are equipped, for example, with a hard metal plate which can be exchanged outside the machine tool.

The machine tool 2 has a working spindle 10 with a spindle head 12. As indicated dotted, the spindle head 12, in the embodiment example shown, is clamped to the working spindle 10 by means of a cone and a tension rod in contact with the cone. The spindle head 12 can be automatically exchangeable by means of a toolchanging device (not shown) integrated in the machine tool 2. Instead of this, it can however also be solidly attached to the working spindle 10.

The spindle head 12 is provided with a facing slide 14, which is radially displaceable relative to the spindle axis A, serves as the tool carrier for the tool block 4 and, for example, is actuated by means of one or more centrally located tension rods.

The tool block 4 is clampable in radially different locations by means of a clamping device 15 (not shown in any more detail in FIG. 1) on the facing slide. For this purpose, the facing slide 14 and the tool block 4 are provided with pointed teeth 16, which lie in a plane radial to the spindle axis A and whose grooves run at right angles to an adjustment direction D.

The tool magazine 8 has a magazine tower 18, which is rotatable about an axis C parallel to the spindle axis A and is also provided with pointed teeth 16 for tool acceptance.

The tool changing device 6 has a double-sided changing arm 20 with tool grippers provided at both of its ends. The changing arm 20 can execute three different types of movement: (1) The changing arm 20 is rotatable by 180° about a pivoting axis B parallel to the spindle axis A in order to transfer tool blocks 4 between the tool magazine 8 and the machine tool 2. (2) The changing arm 20 is displaceable in the adjustment direction D, i.e. in the direction of its longitudinal axis D in order to be able to move the tool block 4 into radially different positions relative to the spindle axis A. (3) The changing arm 20 is displaceable in the direction of its pivoting axis B in order to lift the toolblock 4 out of the pointed teeth 16, as is described more precisely below.

As indicated in FIG. 1, a rotary piston motor 22 is provided for pivoting the changing arm 20. A double acting hydraulically actuated servo-motor 24 serves to provide longitudinal displacement of the changing arm 20 in the adjustment direction D. An actuating device 26 is provided for displacement of the changing arm 20 in the direction of the pivoting axis B, which actuating device simultaneously serves to release the clamping device 15 and lift the tool block 4, as is described more precisely below.

The changing arm 20 together with the devices for bringing about the three different types of movement of the changing arm 20 is supported on a support body 28, which is located separately and outside the working spindle 10 of the spindle head 12 and is independent of movement of the working spindle 10. The support body 28 is designed as a carriage which can be displaced on a base body 30 parallel to the adjustment direction D. An adjustable stop 32 is also mounted on the carriage 28. The adjustable stop 32 is designed as a stop body with stepped stop surfaces 34, which body is displaceable in a direction at right angles to the adjustment direction D. in order to limit a longitudinal displacement of the changing arm 20 in the adjustment direction D corresponding to a desired radial position of the tool block 4.

Figure 2A:
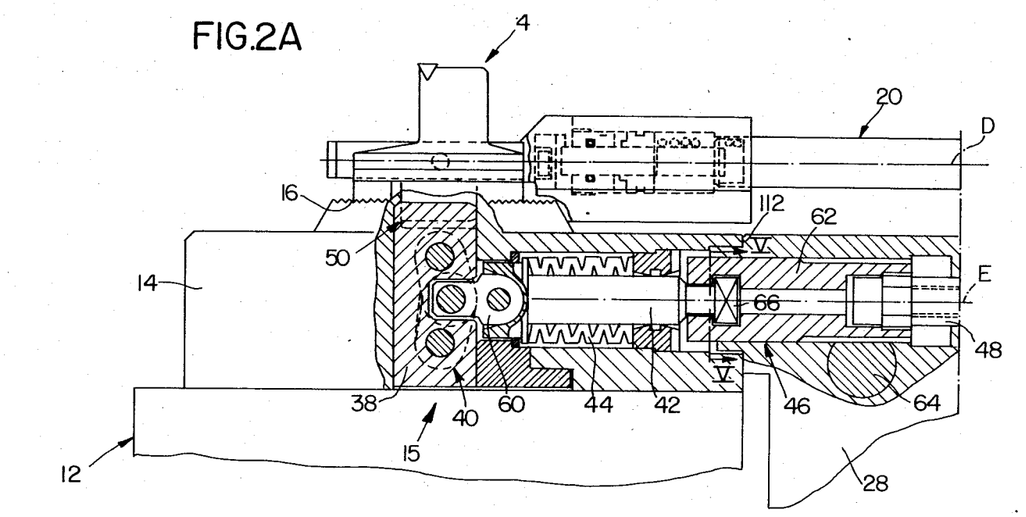
FIGS. 2A and 2B show a partially exploded part representation on a larger scale corresponding to FIG. 1.
Figure 2B:
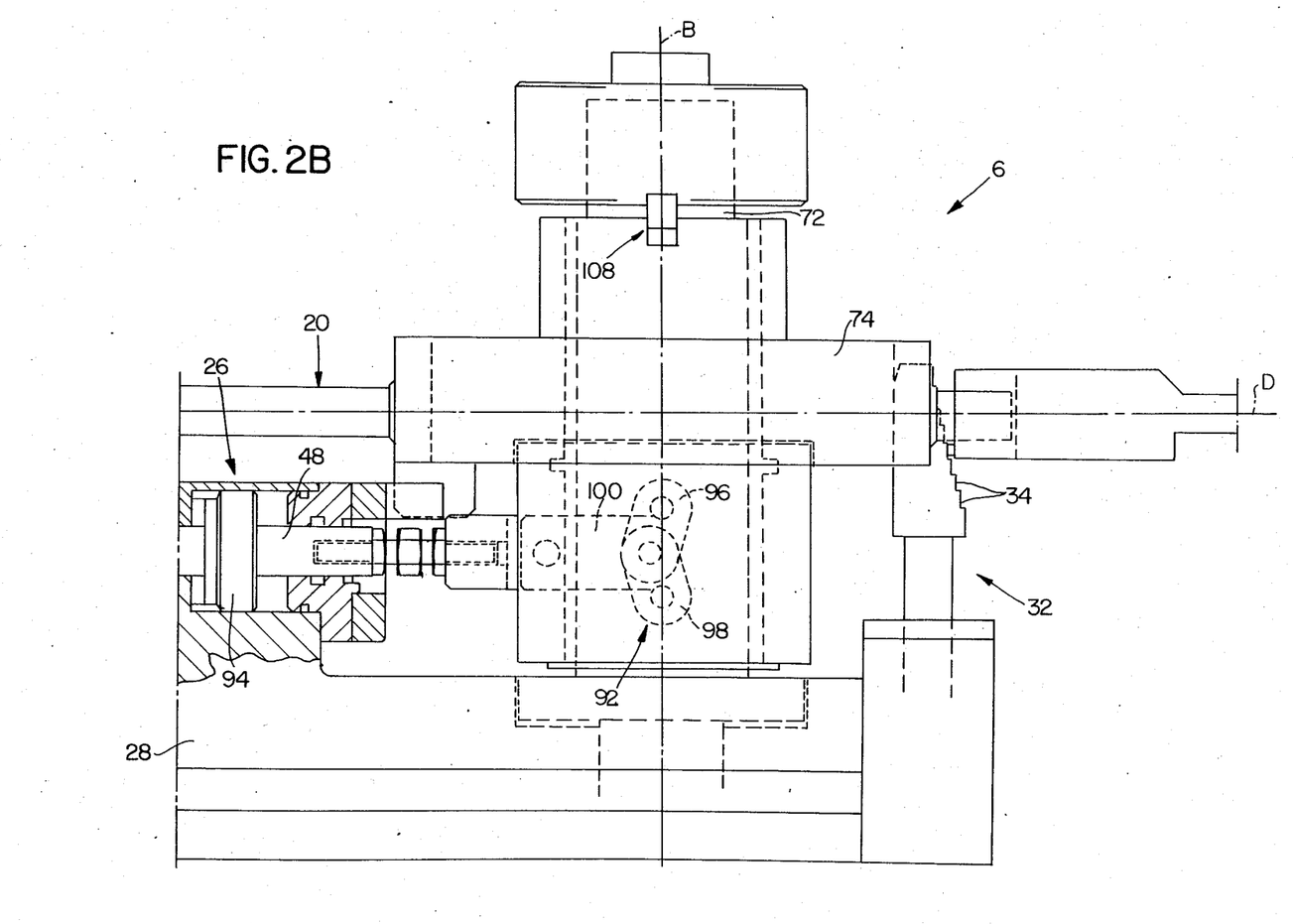
Figure 4:
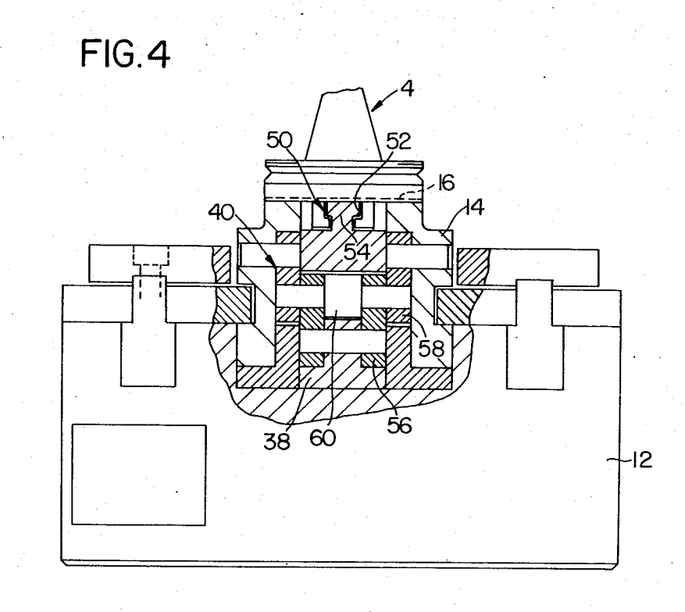
FIG. 4 shows a partially exploded end view of the spindle head.

The clamping device 15 for clamping the tool block 4 is now described more precisely using the FIGS. 2A, 2B and 4. the clamping device 15 has a clamping element 38 which is supported in the facing slide 14 so as to be displaceable in a direction parallel to the spindle axis A. The clamping element 38 grips, with one of its ends, the tool block 4 and draws it, in the clamped condition, into engagement with the pointed teeth 16 provided on the facing slide 14.

The clamping element 38 is connected to a clamping pin 42 by means of a right angle effect non-positive connection in the form of a toggle lever linkage 40. The clamping pin 42 is supported in the facing slide 14 at right angles to the spindle axis A, displaceable in the direction of an axis E parallel to the adjustment direction D. A spring device 44 in the form of a plate spring set is in contact with one end of the clamping pin 42, while the other end of the clamping pin 42 is connectable via a clutch 46 to an actuating rod 48 of the actuating device 26, which actuating rod is displaceably supported in the carriage 28.

The spring device 44 is supported on the facing slide 14 and presses the clamping pin 42 in the direction of extending the toggle lever linkage 40 in such a way that the clamping element 38 clamps the tool block 4 in the pointed teeth 16 of the facing slide 14. The spring device 44 produces, by this means, the clamping force for clamping the tool block 4.

In order to release the clamping, the clamping pin 42 must be displaced from the actuating rod 48 against the spring force, by which means not only is the clamping force released but the tool block 4 is also raised out of the pointed teeth 16 by means of the clamping element 38.

As is shown in FIG. 4, the tool block 4 and the clamping element 38 are in engagement with one another via a T-shaped slot/strip connection 50. For this purpose, the tool block 4 has, on a protrusion provided on its lower side, a T-shaped groove 52, in which a correspondingly shaped T-shaped strip 54 of the clamping element 38 engages. In order to retract and extend the slot/strip connection 50 the tool block 4 must be displaced in the direction of the axis D relative to the clamping element 38 and therefore relative to the facing slide 14.

The toggle lever linkage 40 has three links 56, 58, 60, of which the link 56 is linked to the clamping element 38, the link 58 to the facing slide 14 and both links 56, 58 to the third link 60, which is in turn connected by a pin-joint to the clamping pin 42. As already described, the tool block 4 is, by this means, clamped in the case of an extension of the toggle lever linkage 40 while, in the case of a shortening of the toggle lever linkage 36, the clamping force is removed and the tool block 4 raised out of the pointed teeth 16.

Figure 5:
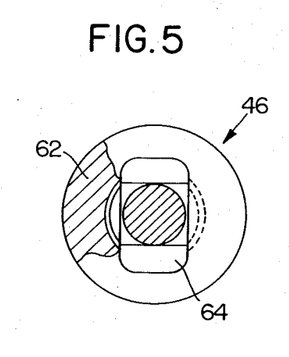
FIG. 5 shows a detailed view of a clutch viewed in the direction of the arrow V—V in FIG. 2A.

The clutch 46 is a rotary clutch which is retractable and extensible by means of an axial relative movement between the clamping pin 42 and the actuating rod 48 and is lockable by means of a relative rotational movement between these components. It has a clutch sleeve 62, which is rotatable relative to the actuating rod 48 but is not displaceable axially. It is in engagement with a rack 64 running at right angles to the axis E, by means of which rack 64 it is rotatable by 90°. The coupling sleeve 46 acts in conjunction with a coupling trunnion 66, which is provided on the clamping pin 42. As is shown in FIG. 5, the coupling trunnion 66 has a noncircular cross-section, with which, in the locked condition, it engages in an undercut recess in the clutch sleeve 46.

The tool changing device 6 is now described more precisely using the FIGS. 2B, 3A, 3B and 6. A guide trunnion 72, which is solidly connected to the carriage 28 (see FIG. 6), serves as the pivoting axis B for the changing arm 20. A rotating body 74 is rotatably supported on the guide trunnion 72. The rotating body 74 contains two piston/cylinder units 24a, 24b (FIG. 3B) forming the servo-motor 24, the axes of which piston/cylinder units run on both sides and parallel to the axis D. Piston rods 78a and 78b extend on both sides on the piston 76a, 76b of the hydraulically actuated piston/cylinder units 24a, 24b, which piston rods 78a and 78b are connected to one another at each of their ends by means of a tool gripper 80 and, in this way, form the changing arm 20.

Figure 3A:
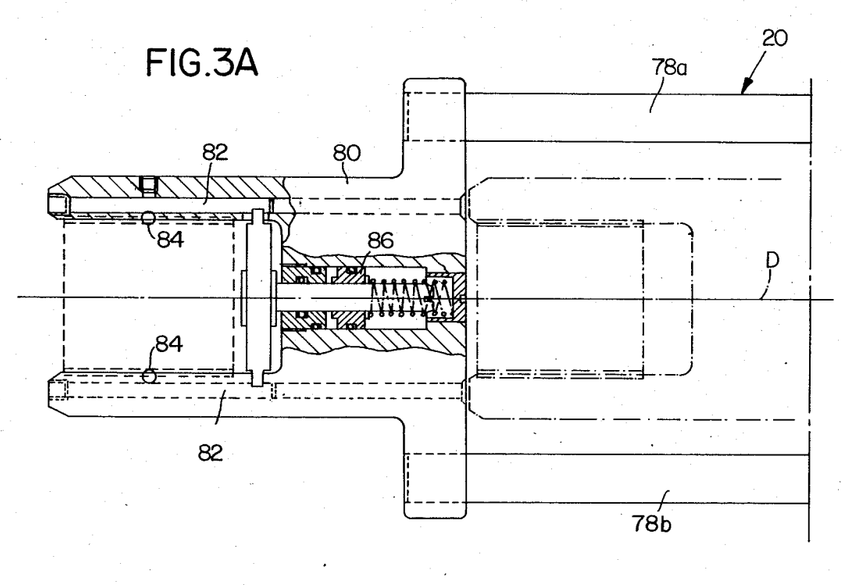
FIGS. 3A and 3B show a partially exploded plan view on the changing arm of the tool changing device.
Figure 3B:
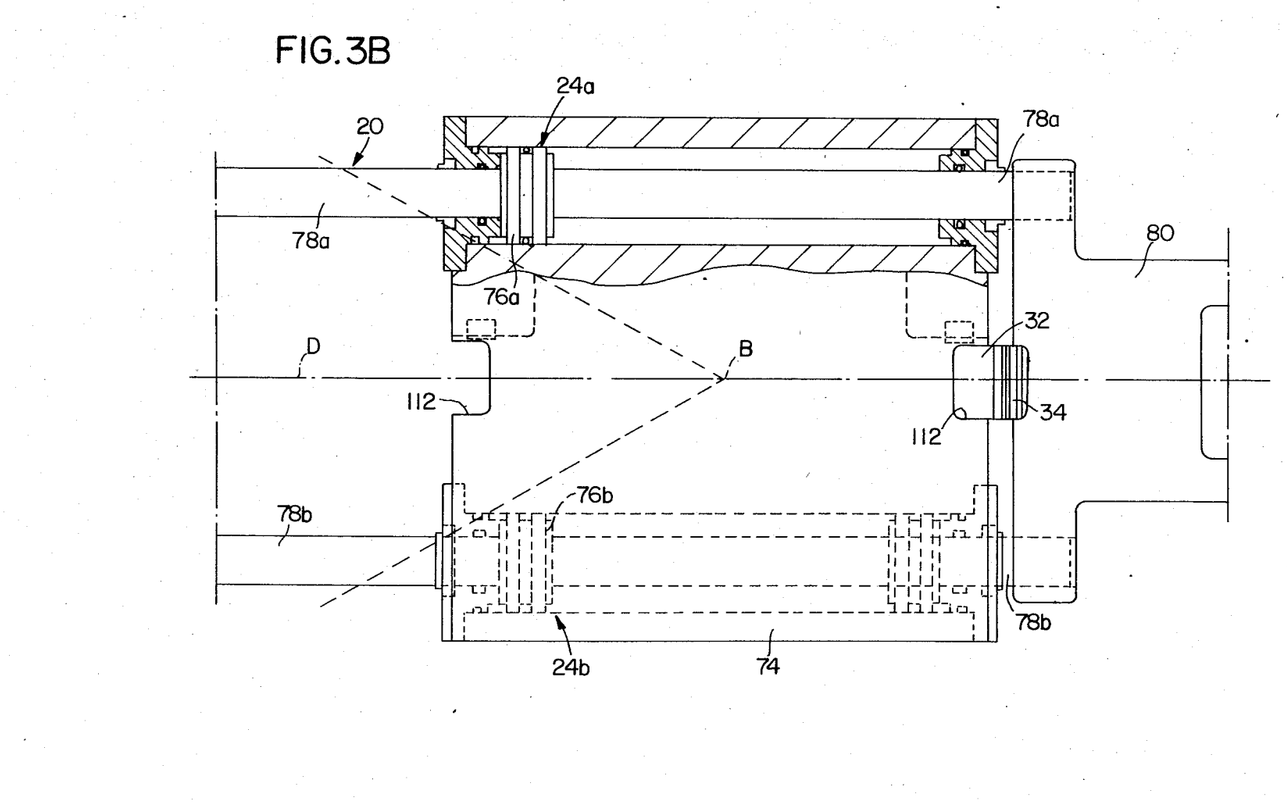

Each tool gripper 80 is of approximately U-shaped form in its gripping area. An actuating pin 82 is displaceably supported in each of the two legs of the U, each of which actuating pins 82 actuates, by means of a cam surface, a ball catch 84 holding the tool block. The actuating pins 82 are actuated by a common servopiston 86, which is actuated in the gripping direction by spring force and in the releasing direction by hydraulic pressure.

The rotating body 74 is displaceable on the guide trunnion 72 not only rotatably but also axially—in the direction of the pivoting axis B. An actuating sleeve 90 is provided to displace the rotating body 74, which actuating sleeve is axially displaceable on the guide trunnion 72 but is rotationally fixed and which is axially undisplaceably but rotatably connected to the rotating body 74 by means of an intermediate ring 88. The actuating sleeve 90 is connected to the actuating rod 48 of the actuating device 26 by means of a right angle effect nonpositive connection 92 in the form of a toggle lever linkage.

The actuating device 26 consists of a double-acting piston/cylinder unit, whose piston 94 has a piston rod extending in opposite directions and forming the actuating rod 48.

The toggle lever linkage 92 is, in principle, constructed like the toggle lever linkage 40 and has the same transfer behaviour. It is again provided with three links 96, 98, 100, of which the link 96 is linked to the actuating sleeve 90, the link 98 to the guide trunnion 72 and both links 96, 98 to the third link 100, which is in turn connected by a pin-joint to the actuating rod 48.

The actuating device 26 is, therefore, connected with both the clamping element 38 and the changing arm 20, via the clutch 46 and the toggle lever linkage 40 on one side (FIG. 2A) and via the toggle lever linkage 92, the actuating sleeve 90 and the rotating body 74, on the other. In this way, the actuating device 26 ensures synchronous movement of the tool block 4 and the changing arm 20 in the direction of the spindle axis A and the pivoting axis B, respectively.

Figure 6:
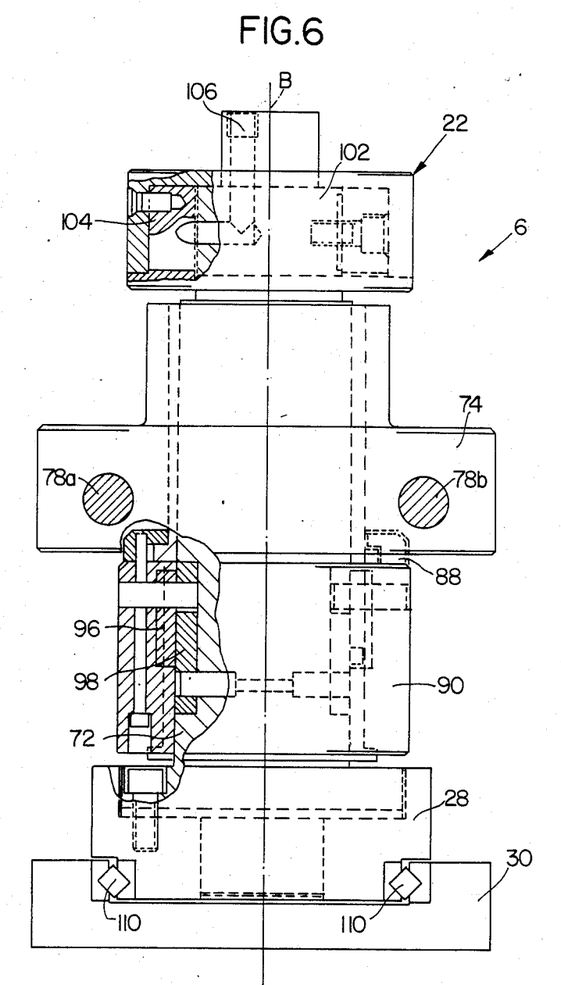
FIG. 6 shows the guide trunnion of the tool changing device.

The rotary piston motor 22 is located at the free end of the guide trunnion 72 and is formed from one end section 102 of the guide trunnion 72 and a rotatable piston part 104 on this end section 102. As is shown in FIG. 6, a connection for a pressure medium supply 106 is provided at the free end of the guide section 72. The rotatable part of the rotary piston motor 22 is connected to the rotating body 74 by means of a rotational connection 108 (FIG. 2B) which permits an axial relative movement between the rotatable part 104 and the rotating body 74.

As may be seen from FIG. 2B, the stop body 32 is located on the side, opposite to the actuating device 26, of the rotating body 74. In its extended position, the stop body 32 extends through a slot 112 provided in the rotating body 74 so that the tool gripper 80 facing towards the tool magazine can come in contact, by means of its rear surface, with one of the stepped stop surfaces 34. The stop body 32 and its adjustment device (not shown in detail) are supported by the carriage 28 which, as shown in FIG. 6, is displaceable on a roller guide 110.

The manner of operation of the tool changing device is described below:

If a tool block 4 is to be changed, the working spindle 10 is moved into a tool changing position adjacent to the carriage 28. The working spindle 10 is brought to rest and the facing slide 14 is directed towards the tool changing device 6. The facing slide 14, which is radially adjustable by means of an actuating rod (not shown) concentric with the spindle axis A, is brought into contact with the carriage 28 by means of a relative displacement between the facing slide 14 and the carriage 28 in such a manner that the carriage 28 enters by means of an annular protrusion into a corresponding bore of the facing slide 14 and, by this means, brings the clutch trunnion 66 into engagement with the clutch sleeve 62 (FIG. 2A). The clamping pin 42 and the actuating rod 48 are coupled together by means of a rotation of the clutch sleeve 62 by 90°. By this means, the carriage 28 comes in contact with a contact surface 112 of the facing slide 14.

The changing arm 20 is driven by the piston/cylinder units 24a, 24b in the adjustment direction D into its gripping position, in which the appropriate tool gripper 80 encloses the tool block 4 and grips the tool block 4 by means of the ball catch 84 actuated by the servo-piston 86.

The clamping pin 42 presses the spring device 44 together by means of an actuation of the actuating device 26 so that the clamping force is taken by the clamping element 38. Simultaneously, the clamping element 38 is so displaced by a shortening of the toggle lever linkage 40 that it lifts the tool block 4 out of the pointed teeth 16.

At the same time, the actuating rod 48 displaces the changing arm 20, by means of the toggle lever linkage 92, the actuating sleeve 90 and the rotating body 74, in the direction of the pivoting axis B so that the changing arm 20 executes the same movement as the tool block 4. Since the release of the clamping force and the displacement of the tool block 4 and the changing arm 20 takes place at the same time, this procedure requires only a very small amount of time.

The changing arm 20 is now moved back in the adjustment direction D in order to release the strip 54 of the clamping element 38 out of the slot 52 of the tool block 4 so that the changing arm 20 can be rotated about its pivoting axis B.

The changing arm 20, which has previously fetched a new tool block from the tool magazine 8 by means of its other gripper 80, is now rotated by 180° in order to bring the new tool block 4 into the tool changing position. During this pivoting movement, however, and before it reaches the pivoting range of approximately ±30° to the axis D indicated in FIG. 3B, it must be moved back in the longitudinal direction, i.e. in the adjustment direction D, in order to avoid collision with the facing slide 14.

The new tool block 4 is now moved in the direction of the axis D by an actuation of the piston/cylinder units 24a, b in such a way that the strip 54 of the clamping element 38 enters into the slot 52 of the tool block 4.

This longitudinal displacement of the tool block 4 is limited by the adjustable stop 32, which has been previously moved into an appropriate stop position corresponding to a desired radial position of the tool block 4 on the facing slide 14.

The adjustable stop 32 does not need to have any particularly high accuracy because the end position of the tool block 4 on the facing slide 14 is fixed by the pointed teeth 16. The tooth pitch of the pointed teeth 16 can, for example, be 1.5 mm. The tool offset steps specified by the teeth are, for example, required in the case of fine-limit boring bars for various boring ranges, whose diameter can be finally controlled by a radial adjustment of the facing slide 14.

By means of an actuation of the actuating device 26, the actuating rod 48 and, via the clutch 46, the clamping pin 42 are now so displaced that the spring device 44 transfers its spring force via the toggle lever linkage 36 and the clamping element 38 to the tool block 16 and so draws the tool block 4 together with its pointed tooth profile against the pointed tooth profile of the facing slide 14. At the same time, the actuating device 26 transfers a corresponding movement to the changing arm 20 via the toggle lever linkage 92. The tool block 4 is now clamped non-positively by the spring device 44 to the facing slide 14.

The tool gripper 80 frees the tool block 4 by an actuation of the servo-piston 86 so that the changing arm 20 can be moved back into its pivoting area. At the same time, the clutch 46 is released by rotation of the clutch sleeve 62 so that the actuating device 26 can again be separated, by means of a relative displacement between the carriage 28 and the facing slide 14, from the part of the clamping device 26 located in the facing slide 14. The working spindle 10 together with the new tool is then moved back into the machining area.

The tool block 4 which has been changed can now, after a raising of the changing arm 24 in the direction of the pivoting axis B and a subsequent displacement of the carriage 28 on its roller guide 110, be brought into the clamping area of the tool magazine 8, where the toolblock 4 is set down on pointed teeth 16 and exchanged for a new tool block.

I claim:

1. A numerically controlled machine tool changing device of the type having a working spindle with a spindle head to accept a rotating tool in the form of an exchangeable tool block and a releasable clamping device for clamping the tool block to the spindle head, the improvement being comprised by said changing device being provided with a double-sided changing arm for tool transfer between the spindle head and a tool magazine, said changing arm being provided with a tool gripper at each of its two ends and being pivotable about a pivoting axis, said pivoting axis being parallel to the spindle axis, said clamping device having a spring arrangement supported on said spindle head for producing a clamping force, an actuating device operably connected to and adapted to move said changing arm for producing a release force for said clamping device (15), said actuating device being adapted to raise said tool block (4) from said spindle head (12, 14) simultaneously during said producing of said release force whereby said changing arm moves synchronously with said tool block during the raising thereof.

2. A machine tool as claimed in claim 1, wherein said actuating device (26) is provided on a support body (28) located outside the working spindle (10) and is connectable by means of a releasable clutch (46) with the part of the clamping device (15) located in the spindle head (12, 14).

3. A machine tool as claimed in claim 2, wherein said spindle head (12) has a radially adjustable facing slide (14), which serves as the tool carrier, in which slide the part of the clamping device (15) in contact with the tool block (4) and including the spring arrangement (44) are located and supported.

4. A machine tool as claimed in claim 3, wherein the clamping device (15) has a clamping element (38), displaceable in the direction of the spindle axis (A), which clamping element is connected, by means of a non-positive connection (40), to a clamping pin (42), displaceable at right angles to the spindle axis (A) and supported in the spindle head (12, 14).

5. A machine tool as claimed in claim 4, wherein said actuating device (26) has an actuating rod (48) displaceably supported in the support body (28), which actuating rod is connectable with the clamping pin (42) by means of the clutch (46).

6. A machine tool as claimed in claim 5, wherein the actuating device (26) is a hydraulically actuated cylinder/piston unit whose piston rod, extending on both sides of the piston (94), forms the actuating rod (48).

7. A machine tool as claimed in claim 6, wherein the clutch (46) is a rotary clutch which is retractable and extensible by means of an axial relative movement between the clamping pin (42) and the actuating rod (48) and is lockable by means of a relative rotation between the clamping pin (42) and the actuating rod (48).

8. A machine tool as claimed in claim 2, wherein the support body is a carriage (28) which is displaceable at right angles to the spindle axis (A) and is fastenable to a contact surface (112) of the spindle head (12, 14).

9. A machine tool as claimed in claim 8 wherein the changing arm (20) is supported on the support body (28).

10. A machine tool as claimed in claim 4, wherein the changing arm (20) is connected, for synchronous movement with the tool block (4), to the actuator rod (48) via a second non-positive connection (92).

11. A machine tool as claimed in claim 10, wherein the first and/or the second non-positive connection (40, 92) is a toggle lever linkage.

12. A machine tool as claimed in claim 11 wherein the rotating body (74) and with it the changing arm (20) is supported, so that it can be longitudinally displaced to raise the tool block (4), on its pivoting axis (c), designed as a guide trunnion (72).

13. A machine tool as claimed in claim 12, wherein an actuating sleeve (90) connected to the actuating device (26) is supported, so as to be longitudinally displaceable and rotationally fixed, on the guide trunnion (72), which actuating sleeve is connected in the longitudinal direction to the rotating body (74) but is unconnected in the rotational direction.

14. A machine tool as claimed in claim 13, wherein the rotary piston motor (22), whose rotatable part (104) is connected to the rotating body (74) by means of a rotary connection (108) permitting longitudinal displacement, is supported on the guide trunnion (72).

15. A machine tool as claimed in claim 14 in conjunction with claim 22, wherein the guide trunnion (72) of the changing arm (20) is fastened to the support body (28).

16. A machine tool as claimed in claim 15 wherein the adjustable stop (32) is located on the support body (28).

17. A machine tool as claimed in claim 16 wherein the spindle head (12) is exchangeably attached to the working spindle (10) by means of a second tool changing device integrated in the machine tool.

* * * * *